Patented July 21, 1936

2,048,066

UNITED STATES PATENT OFFICE 2,048,066

RECTAL NARCOTIC

Erich Goth, Wuppertal-Elberfeld, Germany, assignor to Winthrop Chemical Company, Inc., New York, N. Y., a corporation of New York No Drawing. Application October 26, 1931, Serial No. 571,287. In Germany October 30, 1930

13 Claims. (Cl. 167—52)

The present invention relates to new liquid preparations of tribromoethylalcohol, said preparations comprising tribromoethylalcohol and an aliphatic oxygen containing compound.

When using tribromoethylalcohol as an anesthetic or especially as a rectal narcotic an exact dosing of the same will be of great importance. Hitherto for the purposes of liquefaction of tribromoethylalcohol formamide and liquid monohydric secondary or tertiary alcohols were used. When using these liquid preparations of tribromoethylalcohol in the surgical practice it has proved of remarkable importance that the liquefying medium is adjusted to the peculiarity of each individual case depending on the constitution and the state of organism to which the tribromoethylalcohol is to be applied. The medicinal practice, therefore, necessitates to place at the surgeons' disposal a larger assortment of liquid preparations of tribromoethylalcohol which are stable to light and heating and are capable of complying with the requirements of the practice than known up to date.

In accordance with my present invention new liquid water-free preparations of tribromoethylalcohol are obtainable by treating tribromoethylalcohol with an aliphatic oxygen containing compound of the group consisting of primary alcohols containing 3 to 4 carbon atoms, dehydric alcohols containing at least 3 carbon atoms, polyhydric aliphatic alcohols which contain at least 3 hydroxy groups and 4 carbon atoms, ethers of aliphatic alcohols, alkyl-hydroxy alkyl- and alkoxy alkyl-esters of the lower aliphatic carboxylic acids, ketones, hydroxy ketones and acetals, while using such a quantity of the aliphatic oxygen containing compounds that the mixture is liquid at room temperature, said liquid preparation being stable to light and heating.

As particularly suitable for the purposes specified have proved, for example, propanol and n-butanol, di-alkylethers of glycol, the dihydroxy diethyl ether, esters of aliphatic carboxylic acids containing 2 to 3 carbon atoms, for example, the mono- and diacetate of glycol, alkylesters of glycolic acid, the alpha-methylether beta-acetic ester of glycol, furthermore, the methyl ethyl ketone, the 2-oxo-4-hydroxy-4-methylpentane, the dimethoxy methane.

Since the narcotic compositions as they are known so far would not sufficiently comply with the various requirements of the medicinal practice, an advantage is to be seen in the fact that the plurality of my new liquefying agents can be applied for the most various purposes. It may be mentioned that the liquefying media used in my new liquid preparations of tribromoethylalcohol, may be used as such or in admixture with one another or with the already known liquefying agents.

Of course, the liquefying media used in my new preparations neither as such nor the mixtures show any obnoxious effects on the patient when used in the surgical practice. My new preparations are liquids which are more or less soluble in water. The amount of liquefying agent to be added to the tribromoethylalcohol may vary within wide limits but is advantageously chosen in such a manner that the mixture is liquid at room temperature in any climate, and furthermore exerts the desired pharmacological action in the most cases. Amounts of about 15–100% of the liquefying agent of the kind above referred to, calculated on the amount of tribromoethylalcohol, will be suitable, but it may be mentioned that also larger or smaller quantities may in some cases yield better results and fall within the scope of my invention.

The following examples illustrate my invention without restricting it thereto:

Example 1.—100 parts by weight of tribromoethylalcohol are introduced into 33 parts by weight of n-butanol while stirring, at room temperature. The mixture soon liquefies, the liquid being stable to light and heating. When dissolving the liquid thus obtained in water a clear solution suitable for rectal narcotic purposes results.

Similar results will be obtained by replacing the n-butanol by 32 parts by weight of n-propanol.

Example 2.—100 parts by weight of tribromoethylalcohol are mixed with 35 parts by weight of 1.3-butylene glycol while stirring, at room temperature. The liquid mixture, being stable to light and heating when mixed with water, yields a solution suitable for the indicated purpose.

Similar results will be obtained by replacing the 1.3-butylene glycol, for example, by 35 parts by weight of trimethylene glycol.

Example 3.—100 parts by weight of tribromoethylalcohol are mixed with 38 parts by weight of the dimethyl ether of glycol in the same manner as indicated in Example 1. The dimethyl ether of glycol may be replaced by the same quantity of dioxane or by 25 parts by weight of diethyl ether. The liquid preparation thus obtainable is to be made up to an aqueous solution of the same properties as indicated in Example 1.

*Example 4.*—100 parts by weight of tribromoethylalcohol are stirred together at room temperature with 33 parts by weight of the monoethyl ether of glycol. The liquid preparation thus obtained, after dissolving in water, may be employed with advantage as rectal narcotic.

When replacing the monoethyl ether of glycol by the same quantity of the monomethyl- or monobutyl- ether of glycol, of the beta-beta'-dihydroxy-diethyl ether, of the monoethyl ether of beta-beta'-dihydroxy diethyl ether, of the diethyl ether of glycerine or of the monoethyl ether of trimethylene glycol, similar results will be obtained.

*Example 5.*—33 parts by weight of ethyl acetate are stirred together with 100 parts by weight of tribromoethylalcohol. Instead of ethyl acetate 40 parts by weight of the mono- or diacetate of glycol may be employed. The preparation of the rectal narcotic takes place in the same way as mentioned in Examples 1 to 4.

*Example 6.*—100 parts by weight of tribromoethylalcohol are mixed, while stirring, at room temperature, with 35 parts by weight of the ethyl ester of lactic acid, or 40 parts by weight of the isopropyl ester of lactic acid, or 35 parts by weight of the ethyl ester of glycolic acid, or 40 parts by weight of the isopropyl ester of glycolic acid, or 35 parts by weight of the methyl- or ethyl ester of methoxy acetic acid or with 40 parts by weight of the ethyl ester of ethoxy acetic acid.

*Example 7.*—100 parts by weight of tribromoethylalcohol are stirred together at room temperature, with 30 parts by weight of the alpha-methyl ether-beta-acetic ester of glycol. Instead of the alpha-methyl ether-beta-acetic ester of glycol 35 parts by weight of the alpha-ethyl ether-beta-acetic ester of glycol may be employed with the same advantage.

*Example 8.*—100 parts by weight of tribromoethylalcohol are mixed, while stirring, at room temperature, with 15 parts by weight of acetone. A liquid preparation results displaying the same good properties as indicated in the foregoing examples.

The acetone may be replaced by 23 parts by weight of methyl ethyl ketone or by 40 parts by weight of diethyl ketone.

*Example 9.*—A liquid preparation is made up by mixing together 100 parts by weight of tribromoethylalcohol and 30 parts by weight of the 2-oxo-4-hydroxy-4-methyl pentane. Instead of the 2-oxo-4-hydroxy-4-methyl pentane 23 parts by weight of dimethoxy methane may be used. The liquid preparation thus obtained may be dissolved in water.

*Example 10.*—100 parts by weight of tribromoethylalcohol are mixed, while stirring, at room temperature with 9 parts by weight each of the monomethyl ether of glycol and the monoethyl ether of glycol. The liquid preparation may be dissolved in water.

Instead of the mixture comprising those liquefying agents, indicated above, also other mixtures comprising more than one liquefying agent may be employed, viz:

A mixture of 15.5 parts by weight each of the diethyl ether of glycerol and the ethyl ester of lactic acid; a mixture of 8.5 parts by weight each of acetone and isopropyl alcohol; a mixture of 13.5 parts by weight each of amylene hydrate and n-propyl alcohol; a mixture of 12.5 parts by weight each of the ethyl ester of carbamac acid and ethyl acetate; a mixture of 14 parts by weight each of the ethyl ester of carbamic acid and the monoacetate of glycol; a mixture of 7 parts by weight of acetamide, 15 parts by weight of sarcosine anhydride and 15 parts by weight of the monoethyl ether of glycol.

The quantities for the liquefying agent indicated in the examples are by no means restricted thereto; they may be increased, for example, from 50 to 100 parts by weight, however, not very well decreased.

I claim:

1. A water-free composition of matter which is liquid at room temperature comprising tribromoethylalcohol and an aliphatic oxygen containing compound of the group consisting of primary alcohols containing 3 to 4 carbon atoms, dihydric alcohols containing at least 3 carbon atoms; polyhydric aliphatic alcohols which contain at least 3 hydroxy groups and 4 carbon atoms, ethers of aliphatic alcohols, alkyl-, hydroxy alkyl- and alkoxy alkyl-esters of aliphatic acids, ketones, hydroxy ketones and acetals, said composition of matter being stable to light and heating and being suitable for pharmaceutical purposes.

2. A water-free composition of matter which is liquid at room temperature comprising tribromoethylalcohol and an alkyl ether of such a polyhydric aliphatic alcohol which contains at least 2 carbon atoms, said composition of matter being stable to light and heating and being suitable for pharmaceutical purposes.

3. A water-free composition of matter which is liquid at room temperature comprising tribromoethylalcohol and an alkyl ether of glycol, said composition of matter being stable to light and heating and being suitable for pharmaceutical purposes.

4. A water-free composition of matter which is liquid at room temperature comprising tribromoethylalcohol and a monoalkyl ether of glycol, said composition of matter being stable to light and heating and being suitable for pharmaceutical purposes.

5. A water-free composition of matter which is liquid at room temperature comprising tribromoethylalcohol and the monoethyl ether of glycol, said composition of matter being stable to light and heating and being suitable for pharmaceutical purposes.

6. A water-free composition of matter comprising tribromoethylalcohol and the monoethyl ether of glycol, in a quantity of about 33 to 100%, calculated on the amount of tribromoethylalcohol, said composition of matter being stable to light and heating and being suitable for pharmaceutical purposes.

7. A water-free composition of matter which is liquid at room temperature comprising tribromoethylalcohol and an alkyl ester of an aliphatic carboxylic acid containing 2 to 3 carbon atoms, said composition of matter being stable to light and heating and being suitable for pharmaceutical purposes.

8. A water-free composition of matter which is liquid at room temperature comprising tribromoethylalcohol and an alkyl ester of an aliphatic carboxylic acid of the formula

$$x.OH.COOC_2H_5$$

wherein $x$ stands for a methylen group or for the $CH_3CH$-grouping, said composition of matter being stable to light and heating and being suitable for pharmaceutical purposes.

9. A water-free composition of matter comprising tribromoethylalcohol and the ethyl ester of lactic acid, in a quantity of about 35 to 100%, calculated on the amount of tribromoethylalcohol, said composition of matter being stable to light and heating and being suitable for pharmaceutical purposes.

10. A water-free composition of matter which is liquid at room temperature comprising tribromoethylalcohol and a ketone of the formula $$R_1.CO.R_2$$

wherein $R_1$ and $R_2$ stands for a methyl or ethyl group, said composition of matter being stable to light and heating and being suitable for pharmaceutical purposes.

11. A water-free composition of matter comprising tribromoethylalcohol and acetone, in a quantity of about 15 to 100%, calculated on the amount of tribromoethylalcohol, said composition of matter being stable to light and heating and being suitable for pharmaceutical purposes.

12. A water-free composition of matter which is liquid at room temperature, comprising tribromoethylalcohol and an aliphatic ketone, said composition of matter being stable to light and heating and being suitable for pharmaceutical purposes.

13. As an article of manufacture for anesthetic use, a mixture containing tribromoethylalcohol, urethane and a water soluble alkyl ester, derived from an alcohol and an organic acid.

ERICH GOTH.